Sept. 7, 1926.  
J. O. NESS  
1,598,926  
THRASHING MACHINE  
Filed Sept. 4, 1924
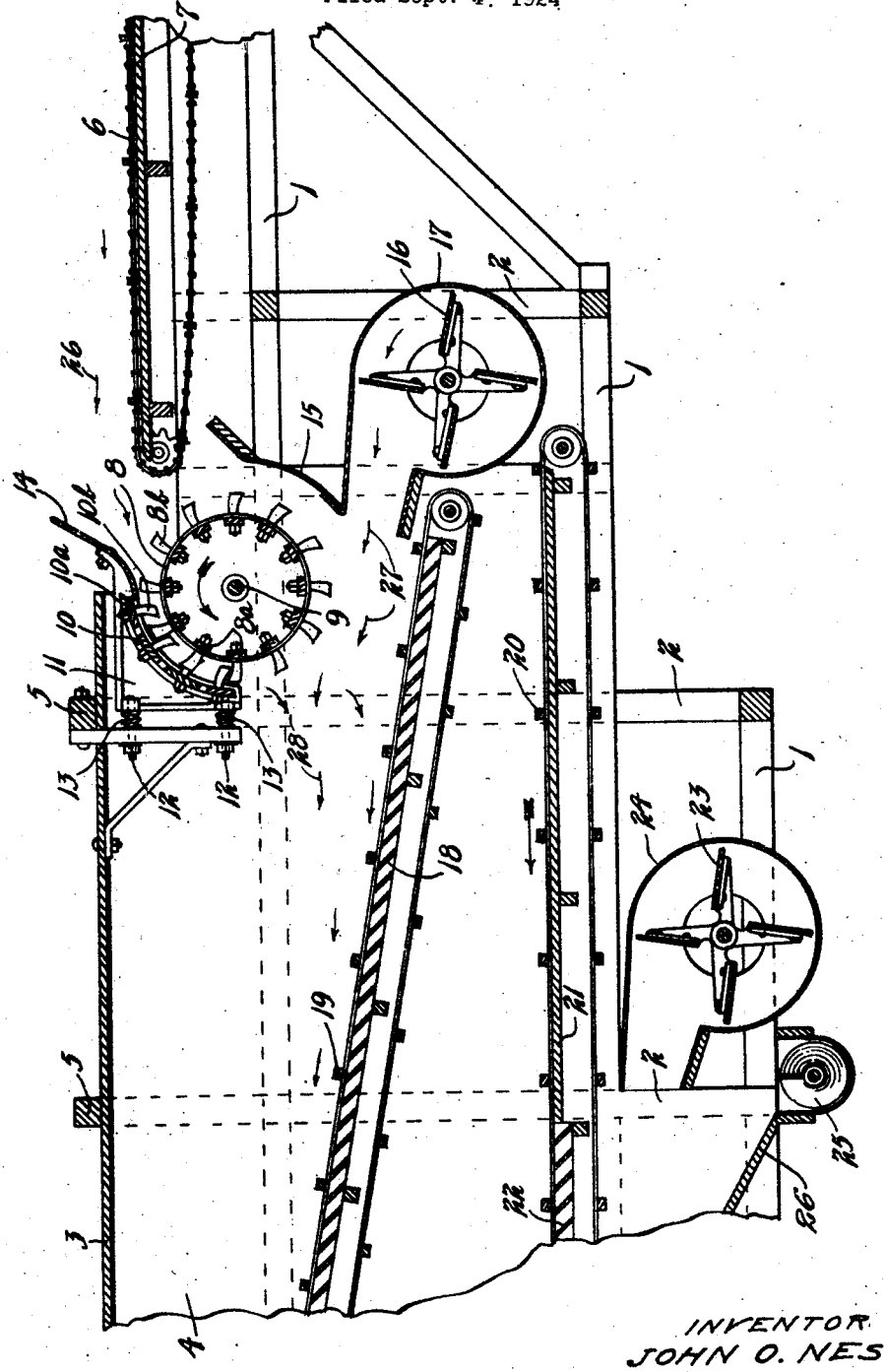
INVENTOR  
JOHN O. NESS  
BY HIS ATTORNEY  
James F. Williamson Patented Sept. 7, 1926.

1,598,926

UNITED STATES PATENT OFFICE.

JOHN O. NESS, OF MINNEAPOLIS, MINNESOTA.

THRASHING MACHINE.

Application filed September 4, 1924. Serial No. 735,792.

This invention relates to a thrashing machine of the well known type now commonly used to thrash the various grains, cereals and plants. In such thrashing machines a cylinder is used to which the grain is fed, which cylinder cooperates with the concave, the grain being beaten between the concave and cylinder. In the machines of the prior art the concave has been disposed beneath the cylinder and usually on the side thereof at which the material is fed. The material passing from the cylinder and concave is discharged into a blast of air passing over a shaking screen or board.

It is an object of this invention to provide a thrashing machine in which the concave is disposed at the upper side of the cylinder and preferably opposite that to which the feeding means is located, whereby the material from the cylinder and concave is discharged downwardly into the blast of air and an improved distribution thereof in the blast obtained.

It is a further object of the invention to provide such a cylinder and concave, disposed as above set forth, both of which are provided with coacting circumferentially spaced rows of teeth, the cylinder rotating away from the feeding means.

It is also an object of the invention to provide such a machine, as set forth in the preceding paragraph, together with means for feeding the material adjacent the upper side of the cylinder, said concave being provided with means for guiding the material between the same and the cylinder and said concave preferably being yieldingly mounted.

These and other objects and advantages of the invention will be fully set forth in the following description made in connection with the accompanying drawings, in which the single figure is a longitudinal vertical section through the thrashing machine.

Referring to the drawing, the thrashing machine of the modern type is illustrated, comprising a frame formed of spaced longitudinal members 1 and spaced vertical members 2, which carry the top 3 and the sides 4, and are connected by various cross members 5. At the front of the machine is an endless conveyor 6 of the well-known chain and slat type running over a deck or floor 7 to which conveyor 6, the grain or other material to be thrashed, is delivered.

The cylinder 8 is disposed a short distance in front of the conveyor 6 with its top substantially flush with the top of said conveyor, said conveyor being mounted on transverse shaft 9, journaled in suitable bearings on the machine and which will be driven as usual by suitable belts and pulleys (not shown). The cylinder 8 comprises the usual spaced rings connected by spaced longitudinally extending slats $8^b$ which carry the circumferentially spaced rows of spaced teeth $8^a$. The cylinder is rotated forwardly or away from the conveyor 6 as indicated by the arrow therein. Disposed at the upper side of cylinder 8 and at the rear side thereof and extending substantially throughout the upper lefthand quadrant thereof is the concave 10. This concave comprises spaced arcuate end members connected by slats $10^a$ which carry the rows of spaced teeth $10^b$. It will be noted that the teeth on the cylinder 8 are curved slightly to the rear relative to the direction of rotation, while the teeth $10^b$ on the concave are curved slightly forwardly. The concave is supported upon the brackets 11 secured to its arcuate end members which brackets are slidable on headed and nutted bolts or rods 12 secured in vertically extending bars on the frame, springs 13 are disposed between the brackets 11 and said bars, which bars are suitably braced to the top member 3. An upwardly curved plate or shield 14 is secured to the forward end of the brackets 11 and projects upwardly and rearwardly over the top of cylinder 8. A curved plate 15 extends down around the forward portion of the cylinder 8 to the top of the discharge conduit of a blast fan 16, suitably housed in a fan casing 17. The fan 16 discharges a blast of air over a slatted board or screen 18, such as usually employed in thrashing machines and over which passes a straw carrying endless conveyor 19. Another endless slatted conveyor 20 is shown moving over a lower deck 21 and a screen or slatted table 22 which boards are disposed below conveyor 19.

Fan 23 housed in a suitable casing 24 directs the blast of air beneath the member 22. A grain collecting chute 26 is illustrated having therein a helical discharge conveyor 25.

In operation, power will be applied to the machine in the usual manner, cylinder 8 will be rotated at high speed as well as the fans 16 and 23, and the conveyors 6, 19 and 20 will be operated. The unthrashed grain, hay or other material will be discharged on the conveyor 6 and will be fed forwardly as indicated by arrows 26 to the upper portion of cylinder 8. As the cylinder is rotating forwardly at high speed this material will be carried by the teeth $8^b$ into the concave and will be beaten between the teeth $10^b$ and $8^b$, in order to separate the grains or seeds from the heads or pods. The straw and grain are discharged substantially vertically from the cylinder and concave and meet the blast of air issuing from fan 16 substantially at right angles. A very efficient action is thus obtained between the material and the blast. The general direction of the blast is indicated by arrows 27 while the path of the straw and lighter material from the cylinder as it is deflected by the blast is indicated by the arrows 28. The straw and lighter material are blown and carried along by the conveyor 19 while the grain is passed through the slats 18 and the various screens and other blasts, such as from the fan 23, in the usual manner, the grain eventually being collected in the chute 26 while the straw, chaff and lighter materials are discharged from the machine.

The mechanism for carrying the chaff and straw and separating the same forms no part of the present invention.

As the material passes between the cylinder and concave, if any choking should occur due to the excessive amounts of material, or any foreign substance, the concave will yield rearwardly against the tension of springs 13 so that the material will be cleared therefrom.

From the above description it is seen that applicant has provided a simple, efficient and improved arrangement of the cylinder and concave of a thrashing machine, and the parts cooperating therewith, very efficient action is obtained by the cylinder and concave and an improved distribution of the material discharged into the blast is also effected. The applicant is an experienced operator of thrashing machines and the present invention has been amply demonstrated in actual practice and found to be very successful and efficient.

It will, of course, be understood that various changes may be made in the form, details, arrangement and proportions of the parts without departing from the scope of applicant's invention, which, generally stated, consists in such a device as described and defined in the appended claims.

What is claimed is:

1. A thrashing machine having in combination a toothed cylinder, a feeding means at the top of said cylinder, and a toothed concave adapted to co-operate with said cylinder to beat the grain, said concave comprising a segment of a hollow cylinder disposed over the upper rear quadrant of said cylinder and being resiliently mounted to yield away from said cylinder in a horizontal plane.

2. A thrashing machine having in combination a toothed cylinder, a toothed concave, a feeding means at the top of said cylinder, said concave extending over the upper rear quadrant of said cylinder, said cylinder being adapted to rotate towards said concave and means attached to said concave, permitting the same to yield away from said cylinder in a horizontal plane as said cylinder is rapidly rotated in operation, and to move towards said cylinder in a horizontal plane as said cylinder is slowly rotated in operation.

3. A thrashing machine comprising a toothed rotating cylinder, means for delivering grain to said cylinder above the same, a toothed concave over the upper rear quadrant of said cylinder, the teeth on said cylinder and said concave being adapted to discharge grain in a substantially vertical plane below said concave, a blower below said cylinder and a screen below said cylinder, said blower being adapted to discharge a blast of air along said screen to strike the grain discharged from said cylinder and concave substantially at right angles.

4. A thrashing machine comprising a toothed rotating cylinder, a feeding means at the top of said cylinder, a toothed concave adapted to co-operate with said cylinder to beat the grain, said concave comprising a segment of a hollow cylinder disposed over the upper rear quadrant of said cylinder whereby when said machine is operated, grain and straw will be discharged from between said cylinder and concave in a stream falling substantially in a vertical plane, and a blower below said cylinder adapted to discharge a blast of air at substantially right angles to the stream of grain and straw discharged from between said cylinder and concave.

5. In a thrashing machine a toothed cylinder, a toothed concave over the upper rear quadrant of said cylinder, feeding means above said cylinder, a feed directing plate fixed to said concave, said concave and plate being resiliently mounted to yield away from said cylinder in a horizontal plane.

6. In a thrashing machine, a toothed cylinder, a toothed concave over the rear quadrant of said cylinder, feeding means above said cylinder, a feed directing plate fixed to said concave, an angular member secured to the rear of said concave, a vertical member at the rear of said angular member, and means extending between said angular member and said vertical member for resiliently cushioning said concave and feed directing plate.

In testimony whereof I affix my signature.

JOHN O. NESS.